(12) United States Patent
Kramer et al.

(10) Patent No.: US 7,084,638 B1
(45) Date of Patent: Aug. 1, 2006

(54) INTERMEDIATE CIRCUIT CAPACITOR SHORT-CIRCUIT MONITORING

(75) Inventors: Harald Kramer, Lohr (DE); Dierk Gress, Hammelburg (DE)

(73) Assignee: Rexroth Indramat GmbH, Lohr am Main (DE)

( * ) Notice: Subject to any disclaimer, the term of this patent is extended or adjusted under 35 U.S.C. 154(b) by 0 days.

(21) Appl. No.: 10/520,810

(22) PCT Filed: Jul. 14, 2003

(86) PCT No.: PCT/DE03/02358

§ 371 (c)(1),
(2), (4) Date: Aug. 1, 2005

(87) PCT Pub. No.: WO2004/010557

PCT Pub. Date: Jan. 29, 2004

(30) Foreign Application Priority Data

Jul. 13, 2002 (DE) ................................ 102 32 145

(51) Int. Cl.
*G01R 31/06* (2006.01)
(52) U.S. Cl. .................................... 324/548; 324/76.66
(58) Field of Classification Search ................ 324/548, 324/76.66

See application file for complete search history.

(56) References Cited

U.S. PATENT DOCUMENTS

| 3,125,720 | A | * | 3/1964 | Swift | 324/548 |
| 3,681,672 | A | | 8/1972 | Strauss | 320/166 |
| 4,805,063 | A | * | 2/1989 | Kataoka et al. | 361/16 |
| 4,956,739 | A | | 9/1990 | Becker et al. | 361/42 |
| 5,510,944 | A | | 4/1996 | Mozar | 361/18 |
| 5,880,589 | A | * | 3/1999 | Okano | 324/548 |
| 6,268,988 | B1 | * | 7/2001 | Baker | 361/42 |

FOREIGN PATENT DOCUMENTS

| DE | 40 29 293 A1 | | 4/1991 |
| EP | 0 351 559 | | 1/1990 |
| GB | 2047495 A | * | 11/1980 |

* cited by examiner

*Primary Examiner*—Walter Benson
(74) *Attorney, Agent, or Firm*—Michael J. Striker

(57) ABSTRACT

The electronic monitoring circuit for monitoring one of a group of series-connected capacitor units in an intermediate circuit in order to detect short-circuiting of one of the capacitor units includes a device for deriving a reference voltage (14) from an intermediate-circuit voltage (L(+), L(−)) applied across the series-connected capacitor units (1, 2), a device for generating a control signal consisting of a voltage difference between the reference voltage (14) and a junction voltage at a junction (13) between two capacitor unit (1, 2) and a device for generating an error signal when said voltage difference falls below or exceeds an activation threshold voltage thus indicating that one of the capacitor units (1,2) has been short-circuited. The activation threshold voltage corresponds to a breakdown voltage of a zener diode provided in the monitoring circuit.

11 Claims, 2 Drawing Sheets

INTERMEDIATE CIRCUIT CAPACITOR SHORT-CIRCUIT MONITORING

BACKGROUND OF THE INVENTION

The present invention relates to an electronic circuit for short-circuit monitoring of one of at least two series-connected intermediate-circuit capacitor units.

Monitoring of this type is required when a plurality of capacitors is connected in series, to achieve a certain voltage sustaining capability. Converters that are connected directly to a 3-phase network operate with an intermediate-circuit voltage of approximately 750 V. Economical capacitors usually have a maximum voltage sustaining capability of 450 V, however. As a result, to obtain the necessary voltage sustaining capability, at least two capacitors of this type must be connected in series. The series-connected capacitors are always connected in parallel with the intermediate circuit.

Modern converters in the low to moderate performance class function according to the PWM (pulse-width modulation) principle, which results in high switching current frequencies and alternating current frequencies in the intermediate circuit. The currents which are therefore produced subject the capacitors to a high thermal load. In the extreme case, this load can result in an at-first undetected short circuit in one of the series-connected elements. The missing capacitance results in an overloading of the remaining capacitors and, possibly, a risk of fire.

SUMMARY OF THE INVENTION

The object of the present invention is to provide a simple monitoring system that is capable of quickly detecting a short circuit in one of a plurality of series-connected capacitor units, whereby a unit can be composed of one or more capacitor(s) connected in any fashion. The system should be able to signal a short circuit to a higher-order control system, and it must be robust enough to withstand high voltages, high temperatures and strong electromagnetic interferences.

An electronic monitoring circuit monitors one of at least two series-connected capacitor units in an intermediate circuit in order to detect short-circuiting of the capacitor unit, and, according to the invention, comprises means for deriving a reference voltage from an intermediate-circuit voltage applied across the at least two series-connected capacitor units;

means for generating a control signal consisting of a voltage difference between the reference voltage and a junction voltage at a junction between two of the capacitor units; and means for generating an error signal when the voltage difference falls below or exceeds an activation threshold voltage thus indicating that the capacitor unit has been short-circuited.

An advantage of the monitoring circuit according to the present invention is that the monitoring is carried out using a simple voltage comparison, whereby the voltage difference between the voltage present at the junction between two of the capacitor units to be monitored and a reference voltage that is relevant for the monitoring and derived from the intermediate-circuit voltage is used as the control signal, which, if one of the capacitor units short circuits, falls below or exceeds an activation threshold voltage and generates an error signal. The state of the error signal is monitored by the drive computer or a higher-order control unit. If an error occurs, the relevant error reaction is carrier out. As an alternative or in addition, the error can also be displayed using a display means, e.g., a light-emitting diode on the drive.

An advantage of the present invention is that the capacitors are either monitored individually, or they can be connected in parallel or in series to form units that can be treated and monitored as individual capacitors. The units can then be adapted exactly to the requirements of the converter.

In a preferred embodiment, the required reference voltage is generated from a chain of series-connected resistors, the chain being connected in parallel with the units to be monitored. The voltage divider created in this manner ensures that voltage fluctuations, which are common in an intermediate circuit, are automatically mirrored by the reference signal and are therefore compensated for. The capacitor monitoring is indifferent with regard for voltage fluctuations of this type.

In a further preferred embodiment, the response threshold which is relevant for the system is established by the breakdown voltage of a zener diode. The zener diode ensures that electronic disruptions do not result in an undesired triggering of the error signal.

To insulate the error signal voltage from the zero volt potential of the intermediate-circuit voltage, an error signal voltage is generated using a current-voltage converter directly from the current that flows due to the voltage asymmetry produced when an error occurs.

A further advantage of the present invention lies in the fact that the error signal-generating current is limited by the chain of resistors required to generate the reference voltage. The resistors have two separate functions for this reason, and are optimized for both of them simultaneously. This results in a reduction in the number of components.

In a further preferred embodiment, an element corresponding to each capacitor unit is provided in the chain of resistors, whereby an element is composed of one or more resistors. The individual capacitor units are monitored in this manner.

In a further preferred embodiment, the ratio of capacitor capacitance (in farads) to the corresponding part of the chain of resistors is essentially the same for all pairs of corresponding resistor parts and capacitors. This ensures that the electrical potential difference which exists in the normal state between the junctions between two of the capacitors to be monitored, and that which exists in the normal state at the junction between the two corresponding parts of the chain of resistors does not exceed a predefined threshold.

In a further preferred embodiment, the error signal voltage is free of ground potential. The advantage of this is that the error signal voltage can be allotted to any ground potential.

In a further preferred embodiment, the error signal voltage is generated using a light-emitting diode-insulated transistor. For this reason, the error signal voltage is galvanically separated from the high voltage to be monitored. Opto-insulating components are reliable and easy to install, in contrast to magnetic components.

In a preferred embodiment, all capacitor units to be monitored have the same capacitance. This simplifies the circuit and the selection of resistors corresponding to the capacitors. To further reduce the fabrication cost and simplify the circuit, every part of the chain of resistors is composed of a resistor.

In a further preferred embodiment, the number of capacitor units to be monitored is equal to two. The advantage of this embodiment is that the complexity of the circuit is minimized.

In a further preferred embodiment, every capacitor unit is composed of one capacitor, which results in further simplification of the circuit.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
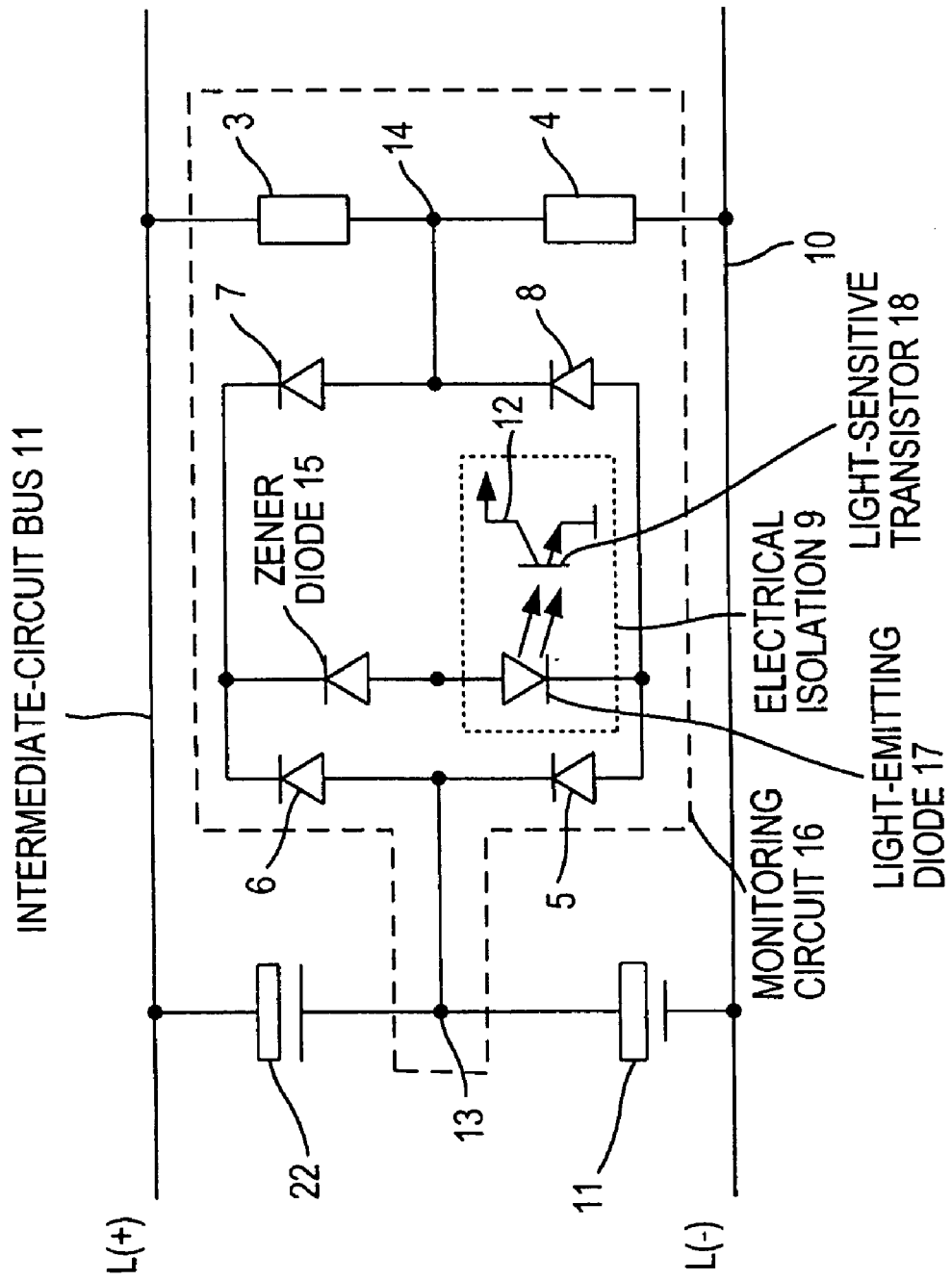
FIG. 1 is a schematic circuit diagram of an intermediate-circuit bus of a frequency converter with a monitoring circuit according to the invention for detecting short circuits in capacitor units.
Figure 2:
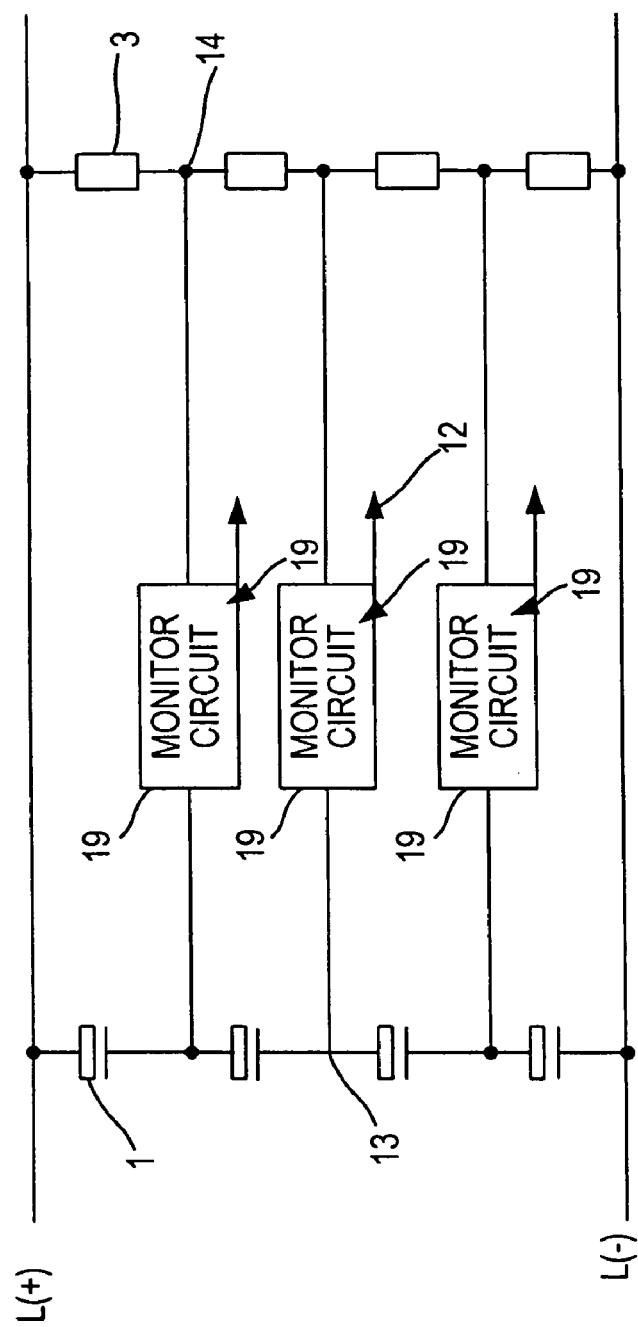
FIG. 2 is a schematic circuit diagram of an intermediate-circuit bus with a plurality of monitoring circuits for detecting short circuits in a plurality of capacitor units.

FIG. 1 shows a schematic illustration of the intermediate-circuit bus (10, 11) of a frequency converter, including two series-connected capacitors (1, 2) and the monitoring circuit (16) according to the present invention. FIG. 2 shows an example of an intermediate-circuit bus with a plurality of series-connected capacitors (1) and their associated monitoring units (19). In FIG. 1, the capacitors (1, 2)—considered together—have an increased voltage sustaining capability, which corresponds to the sum of the two rated voltages, but have reduced capacitance, in accordance with Kirchhoff's voltage law. If the reduced capacitance is not adequate and larger capacitors (1, 2) with the required voltage sustaining capability are not available, further capacitors can be connected in parallel, to increase overall capacitance. In this example, the intermediate-circuit voltage is equal to the difference between $L^{(+)}$ (10) and $L^{(-)}$ (11).

The monitoring circuit (16) is preferably composed of two series-connected resistors (3,4), four diodes (5), (6), (7). (8), a zener diode (15), and an electrically isolated output (12). In this case, the electrical isolation (9) is realized by a combination of a light-emitting diode (17) and a light-sensitive transistors (18), the transistor including an open collector output (12). Diodes (5) and (6), and (7) and (8) are connected in series, whereby the cathode of diodes (5) and (8) is connected to the anode of diodes (6) and (7). The two diode pairs are then connected in parallel, so that the cathodes of the diodes (6) and (7) are connected with each other, and the anodes of diodes (5) and (8) are connected with each other. The connection between diodes (5) and (6) is connected to the capacitor voltage to be measured. The connection point between diodes (7) and (8) is connected to the reference voltage.

The cathode of the zener diode (15) is connected to the cathodes of diodes (6) and (7), and its anode is connected, with reverse polarity, to the cathode of the light-emitting diode of the optical insulating component. The cathode connection of the insulating component is connected with the anodes of diodes (5) and (8).

Since the capacitors (1, 2) and resistors (3, 4) all have a voltage-dividing function, half—at first approximation—of the intermediate-circuit voltage is present, in normal operation, at the two junctions (14) and (13), i.e., the voltage difference between junctions (14) and (13) is nearly zero. In this state, no current flows between the two junctions.

Since both voltages form the same linear function of the intermediate-circuit voltage, and since only the differential voltage is relevant, negative effects that would be expected due to the noise and voltage fluctuations that often occur in the intermediate-circuit bus are eliminated.

When a capacitor (2,1) short circuits, a voltage difference forms between junctions (13) and (14). When this voltage difference exceeds a predefined threshold that corresponds to the sum of two diode voltages (7,5) or (6,8) plus the zener diode (15) breakthrough voltage, current flows. The circuit is designed so that current always flows through the zener diode (15) in the same direction, independently of whether the voltage at junction (13) is greater than or less than the voltage at junction (14).

The current resulting from the voltage asymmetry activates the light-emitting diode (17), which switches the transistor (18) on, thereby activating the error signal (12). The strength of the current is limited by the size of the resistor (3) and/or (4). Since the properties of zener diodes and light-emitting diodes are dependent on the current intensity, the components must be designed such that a rapid activation of the error signal (12) is ensured. When a plurality of capacitors (1,2) is connected in series, then, to ensure that the individual capacitors (1,2) are monitored, the monitoring circuit must be present in plurality, i.e., an additional monitoring circuit must be installed for each additional series-connected capacitor. This is shown in FIG. 2, whereby the four capacitors (1) are monitored by three monitoring units (19). One error signal output (12), one reference voltage input (14) and an associated capacitor voltage input (13) are provided for each unit. Activation of an error signal (12) is still caused by a capacitor short circuit (1), whereby the short-circuiting of a capacitor (1) can trigger one or more error signals (12). All error signals (12) should be monitored so that, if a short circuit occurs, it is possible to determine exactly which capacitor (1) has failed.

What is claimed is:

1. An electronic monitoring circuit for monitoring one of at least two series-connected capacitor units in an intermediate circuit in order to detect short-circuiting of said one of said capacitor units, said monitoring circuit (16) comprising:
   means for deriving a reference voltage (14) from an intermediate-circuit voltage (L(+).L(-)) applied across said at least two series-connected capacitor units (1, 2);
   means for generating a control signal consisting of a voltage difference between said reference voltage (14) and a junction voltage at a junction (13) between two of said capacitor units (1, 2); and
   means for generating an error signal when said control signal falls below or exceeds an activation threshold voltage thus indicating that said one of said capacitor units (1.2) has been short-circuited;
   wherein said means for generating said error signal when said voltage difference falls below or exceeds said activation threshold voltage comprises a zener diode (15) and said activation threshold voltage corresponds to a breakdown voltage of said zener diode.

2. The monitoring circuit as defined in claim 1, wherein said means for deriving said reference voltage (14) comprises a plurality of series connected resistors (3,4) and wherein said plurality of said series-connected resistors (3,4) is connected in parallel with said at least two series-connected capacitor units (1,2).

3. The monitoring circuit as defined in claim 1, wherein said error signal corresponds to an error signal voltage and said error signal voltage is based on a freely selectable ground potential.

4. The monitoring circuit as defined in claim 3, wherein said current flowing due to said voltage asymmetry when said error occurs is limited by a resistor chain.

5. The monitoring circuit as defined in claim 4, wherein respective intermediate-circuit capacitor units correspond to corresponding parts of said resistor chain, each of said parts consisting of at least one chain resistor, and respective ratios of capacitance of said respective intermediate-circuit capacitor units to resistance of said corresponding parts of said resistor chain are substantially the same for all resistor-chain-part-capacitor pairs.

6. The monitoring circuit as defined in claim 4, wherein each of said parts of said resistor chain consists of a single chain resistor.

7. The monitoring circuit as defined in claim 1, wherein said means for generating the error signal comprises a light-emitting diode (17) and a light-sensitive transistor (18) and said light-emitting diode (17) and light-sensitive transistor (18) are arranged to generate said error signal from said voltage difference when said voltage difference is applied to said light-emitting diode.

8. The monitoring circuit as defined in claim 1, wherein said means for generating said error signal comprises a current-voltage converter and said current-voltage converter generates an error signal voltage directly from a current flowing due to voltage asymmetry produced when an error occurs.

9. The monitoring circuit as defined in claim 1, wherein each of said capacitor units consists of a capacitor.

10. The monitoring circuit as defined in claim 1, wherein each of said capacitor units consists of a plurality of capacitors connected in series and/or parallel with each other.

11. The monitoring circuit as defined in claim 1, wherein each of said capacitor units have the same capacitance.

* * * * *